United States Patent [19]

Matsushita

[11] Patent Number: 4,982,378

[45] Date of Patent: Jan. 1, 1991

[54] MEMORY CAPACITY DETECTING DEVICE FOR MEMORY CARDS

[75] Inventor: Tsuyoshi Matsushita, Shizuoka, Japan

[73] Assignee: Tokyo Electric Co., Ltd., Tokyo, Japan

[21] Appl. No.: 127,940

[22] Filed: Dec. 2, 1987

[30] Foreign Application Priority Data

Dec. 6, 1986 [JP] Japan ................. 61-290807

[51] Int. Cl.$^5$ .............................................. G11C 7/00
[52] U.S. Cl. ......................... 365/189.01; 365/201; 365/230.03; 400/692
[58] Field of Search ............. 365/189.01, 201, 230.03; 400/692

[56] References Cited

U.S. PATENT DOCUMENTS

| | | | |
|---|---|---|---|
| 4,545,010 | 10/1985 | Sacas et al. | 364/200 |
| 4,592,011 | 5/1986 | Mantellina et al. | 364/900 |
| 4,653,945 | 3/1987 | Sato et al. | 400/144.2 |
| 4,684,275 | 8/1987 | Matsushita et al. | 400/479 |

FOREIGN PATENT DOCUMENTS

| | | |
|---|---|---|
| 0136178 | 4/1985 | European Pat. Off. . |
| 0193306 | 9/1986 | European Pat. Off. . |
| 57-27500 | 2/1982 | Japan . |
| 2175716 | 12/1986 | United Kingdom . |

OTHER PUBLICATIONS

Availability of Additional Storage Capacity, K. Fritsch, et al. IBM Technical Disclosure Bulletin, vol. 15, No. 12, May 1973, p. 3796.

*Primary Examiner*—James W. Moffitt
*Attorney, Agent, or Firm*—Frishauf, Holtz, Goodman & Woodward

[57] ABSTRACT

A memory capacity detecting device for memory cards including at least one memory chip of a predetermined memory capacity comprises an address specifying section for generating an address signal which selectively specifies two memory chips, a data write-in section for writing two items of preset data into top memory locations of the specified memory chips, and chip number detecting section for detecting the number of memory chips in the memory card by first reading out the data from the top memory location of each specified memory chip, comparing the readout data with the corresponding preset data, and determining the number of memory chips based on the comparision results. Particularly, the data write-in section includes writing section for writing different two items of the preset data into the top memory locations, and the chip number detecting section includes reading section for reading out the data from the top memory location of each specified memory chip after all the preset data items have been written.

7 Claims, 6 Drawing Sheets

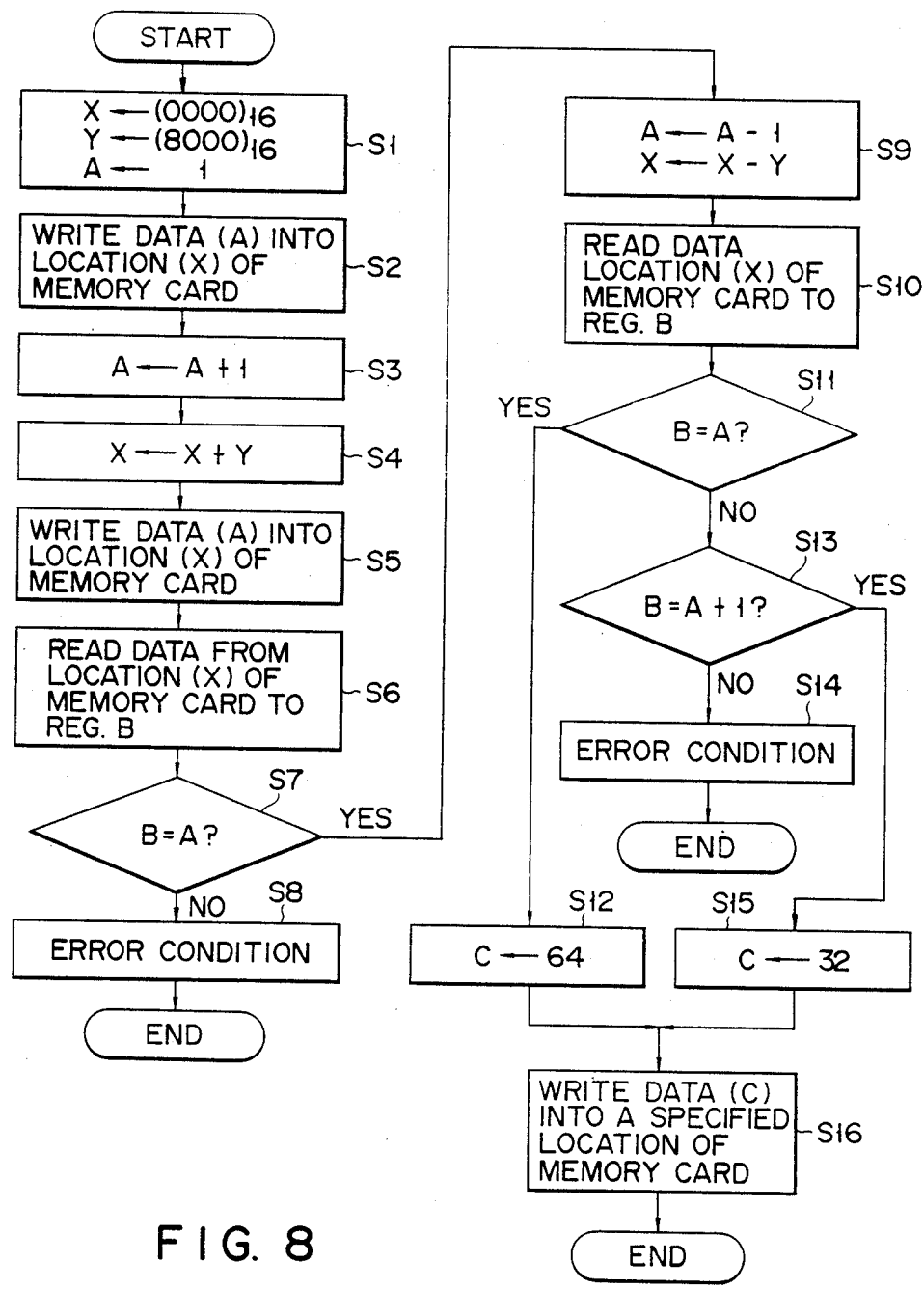
F I G. 8

MEMORY CAPACITY DETECTING DEVICE FOR MEMORY CARDS

BACKGROUND OF THE INVENTION

This invention relates to a memory capacity detecting device for various types of memory cards which include one or more memory chips.

FIG. 1 is a schematic view of a memory card which is generally used. Memory circuits shown in FIGS. 2 and 3 are well known in the art as a circuit of such memory cards. That is, the memory card shown in FIG. 2 has memory unit 10, three connector pins 12A, 12B and 12C connected to signal lines, and switches 13A, 13B and 13C which are grounded at one end and respectively connected at the other end to connector pins 12A, 12B and 12C. The switching states of switches 13A to 13C are determined to generate a capacity code of three bits representing the memory capacity of memory unit 10. The three bits of the capacity code are derived from connector pins 12A to 12C. That is, in this example, a 3-bit capacity code can be selectively determined to represent eight different memory capacities by selectively setting the switching states of switches 13A to 13C.

The memory card shown in FIG. 3 includes memory unit 18 formed of four semiconductor memory chips 14 to 17, and decoder circuit 19 for decoding a 2-bit address signal indicating the number of the memory chips to be used and supplying chip enable signals CS0 to CS3 to memory chips 14 to 17, respectively.

In the memory card of FIG. 3, the presence of each of the memory chips can be determined by writing data into a specified address location of the memory chip, reading out the data from the specified address location and then comparing data in the specified address location prior to the write-in operation and data read out from the specified address location. If it is detected that both data are the same, it is determined that the memory chip is present, but if not, then it is determined that the memory chip is not present. For example, if each of the memory chips has 8 K bytes and it is detected that memory chip 17 is not present, then the memory card is determined to have a memory capacity of 24 K bytes.

In the memory card of FIG. 2, it is necessary to provide switches 13A to 13C and the signal lines. Therefore, with the increase in the number of different memory capacities of the memory cards, it becomes necessary to increase the number of switches and signal lines, making the memory card complicated in construction. Further, since the switches are mechanically operated, the easy and reliable operation for determining the memory capacity cannot be attained.

In the memory card of FIG. 3, decoder circuit 19 is provided to decode an address signal of a number of bits which can represent the maximum number of memory chips to be used. The same type of decoder circuit with the complicated construction is used in a memory card even if it contains only one memory chip, making it expensive.

In general, most of the memory cards on the market are so designed that only an address signal of a number of bits corresponding to the number of memory chips used in the memory card can be decoded. In this case, when memory cards of various memory capacity are used as an auxiliary memory device in a computer system such as an electronic typewriter, there occurs a problem that the memory capacity of the memory card on the market cannot be detected.

SUMMARY OF THE INVENTION

An object of this invention is to provide a memory capacity detecting device capable of easily detecting the memory capacity of various memory cards.

This object can be achieved by a memory capacity detecting device for memory cards including at least one memory chip of a predetermined memory capacity comprising, an address specifying section for generating an address signal which selectively specifies a predetermined number of memory chips, a data write-in section for writing different items of preset data into the predetermined memory locations of the predetermined memory chips which each specifically correspond to one of the address signals generated by the address specifying section, and a chip number detecting section for detecting the number of memory chips in the memory card by first reading out data from the predetermined memory location of each specified memory chip, comparing the readout data with corresponding preset data, and determining the number of memory chips based on the results of this comparison.

In this invention, the address specifying section generates an address signal which selectively specifies a predetermined number of memory chips which can be provided in the memory card, permitting the data write-in section to write different items of preset data into the predetermined memory locations of the memory chips which each correspond to one of the address signals generated from the address specifying section. The chip number detecting section reads out the data from the predetermined memory location of each specified memory chip after all the preset data items have been written, comparing the readout data with the corresponding preset data, and determining the number of memory chips based on the comparison results. Therefore, even if a memory card does not have a decoder which is capable of decoding an address signal of bits of a number larger than necessary, the memory capacity of various memory cards can be nevertheless easily detected.

BRIEF DESCRIPTION OF THE DRAWINGS

FIG. 8 is a flow chart explaining the operation of initializing the memory card effected by a CPU in the circuit of FIG. 5;

DETAILED DESCRIPTION OF THE PREFERRED EMBODIMENTS

Figure 1:
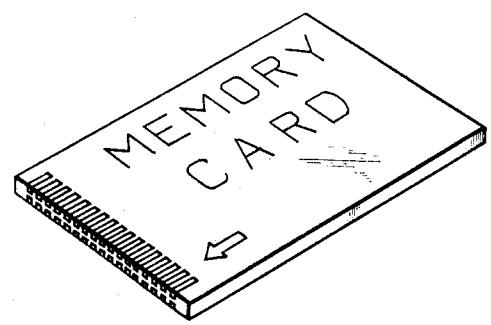
FIG. 1 shows an ordinary memory card.
Figure 2:
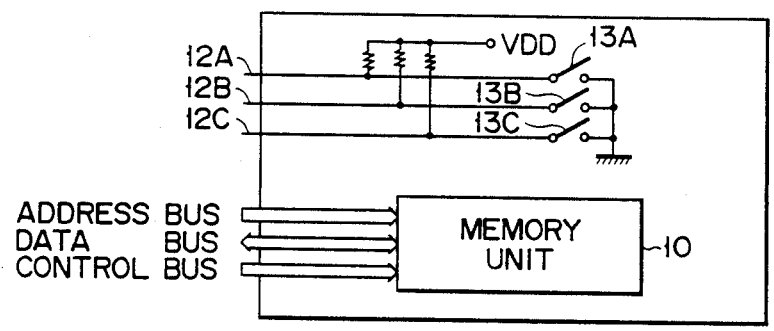
FIGS. 2 and 3 show circuit constructions of the prior art memory cards.
Figure 3:
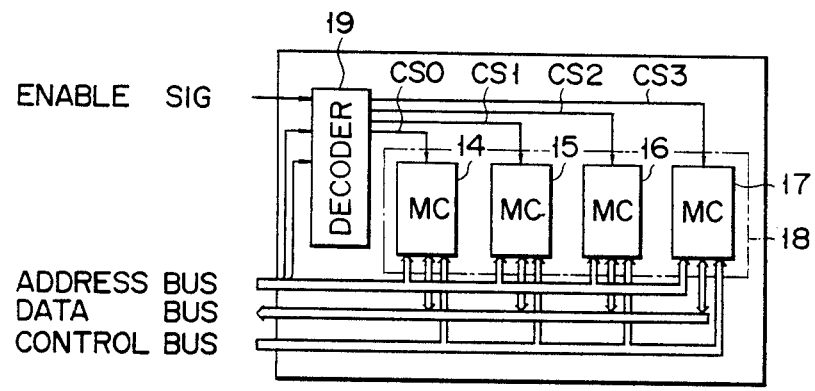
Figure 4:
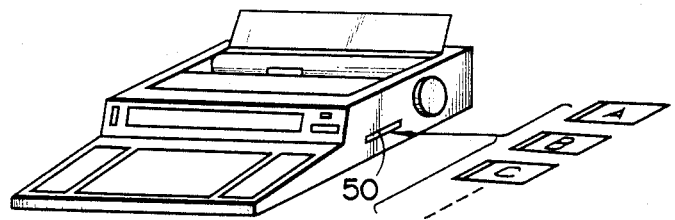
FIG. 4 is a perspective view of an electronic type writer in which a memory capacity detecting circuit according to this invention can be incorporated.

There will now be described a memory capacity detecting device according to one embodiment of this invention with reference to FIGS. 4 to 10. FIG. 4 shows the appearance of an electronic typewriter in which the memory capacity detecting device can be incorporated. The memory capacity detecting device is used to detect the memory capacity of a memory card which is inserted into inlet 50 as an auxiliary memory device of the electronic type writer. The memory capacity of the memory card, detected y the memory capacity detecting device, is selected from a predetermined number of memory capacities or a selectable range of memory capacity, and each of the memory cards is formed to have one or a preselected number of semiconductor memory chips. Each of the semiconductor memory chips is a RAM which has a predetermined number of word memory areas and a decoder capable of decoding an address signal for selectively specifying one of the word memory areas. The memory capacity detecting device, supplies an address signal to the memory card to tentatively access all the memory chips which can be provided in the memory card, checks whether or not the memory chip exists where it should be, and determines the number of memory chips actually provided in the memory card.

Figure 5:
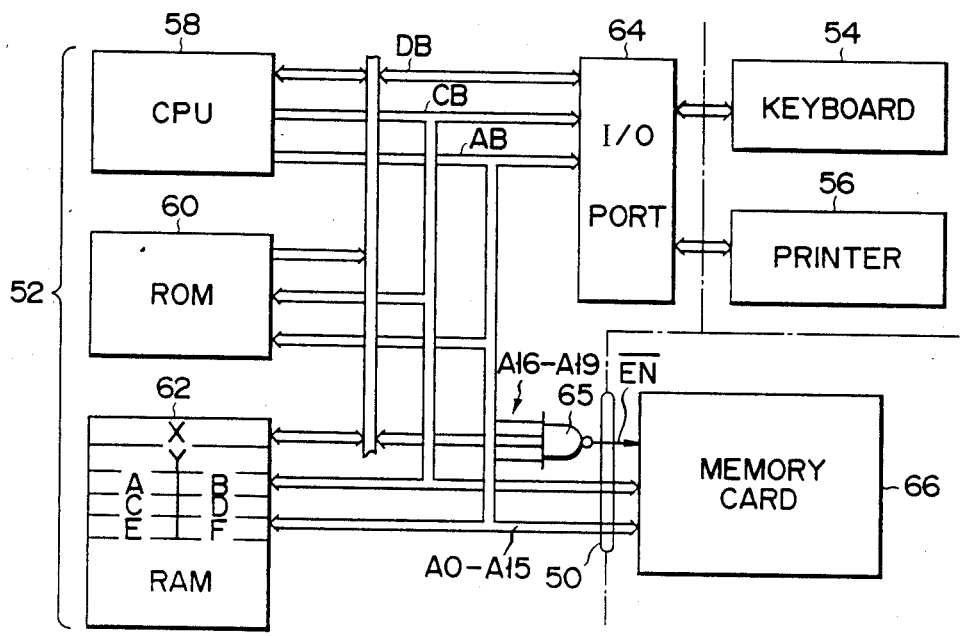
FIG. 5 is a circuit diagram of the electronic type writer as is shown in FIG. 4.

FIG. 5 is a circuit diagram of the electronic type writer of FIG. 4. The electronic type writer includes control section 52, full keyboard 54, and printer 56. Input data such as character data, numeral data and command data, are supplied from full keyboard 54 to control section 52. Control section 52 processes input data in order to supply printing data to printer 56 which, in turn, performs printing operation based on the printing data. Control section 52 includes 16-bit CPU 58 (for example, 8088), ROM 60, RAM 62 and I/0 port 64. CPU 58, ROM 60, RAM 62 and I/0 port 64 are connected with one another via 20-bit address bus AB, 8-bit data bus DB and control bus CB. Full keyboard 54 and printer 56 are connected to I/0 port 64. When memory card 66 is inserted into inlet 50, memory card 66 is connected to CPU 58 via address bus AB, data bus DB, control bus CB and to an output terminal of 4-input NAND gate 65 via card enable line EN. Input terminals of NAND gate 65 are connected to high order bit lines A16–A19 of address bus AB. Bit lines A16–A19 are set at a high potential level when card memory 66 is accessed. Program data is stored in ROM 60 and is sequentially read out for execution by CPU 58. CPU 58 executes the program data not only to process the input data but also initialize memory card 66. The memory capacity of memory card 66 is detected at the initialization process. RAM 62 is used to temporarily store input and output data of CPU 58. Part of RAM 62 serves as buffer memory areas for storing input data supplied from keyboard 54 and printing data supplied to printer 56. Further, RAM 62 includes A-, B-, C-, D-, E-, F-, X- and Y-registers used for storing data necessary for determining the memory capacity of memory card 66.

Figure 6A:
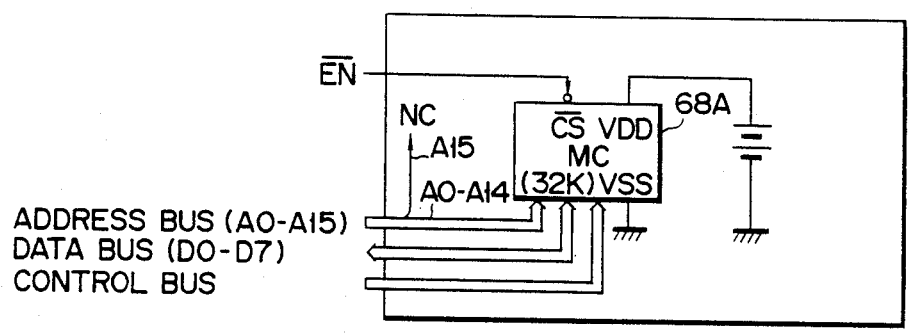
FIG. 6A and 6B respectively show memory cards having one and two memory chips, which can be used in the typewriter as is shown in FIG. 5.
Figure 6B:
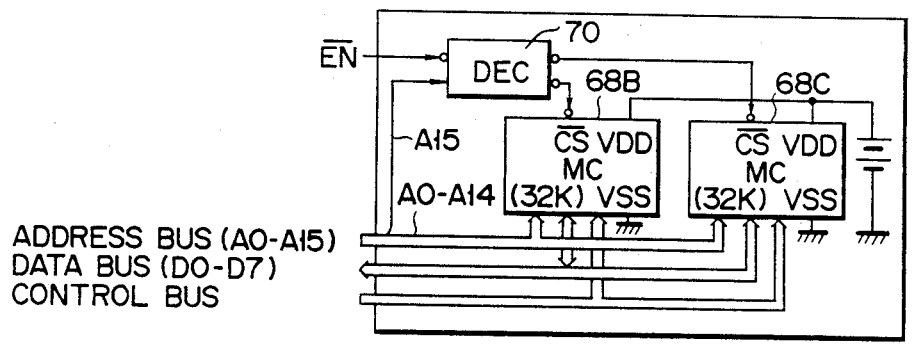
Figures 7A, 7B:
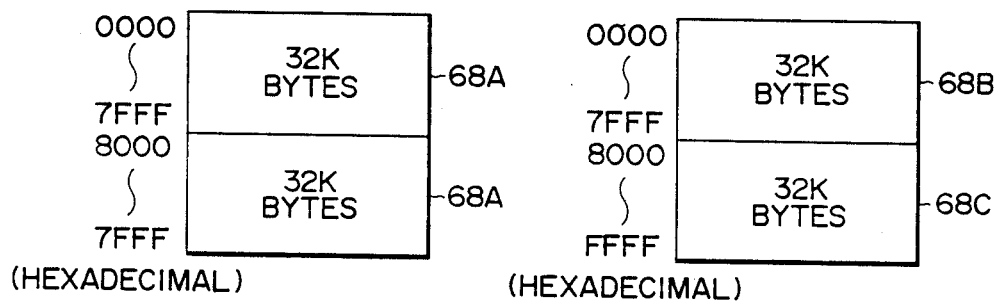
FIG. 7A and 7B show memory maps of the memory chips as used in the memory cards in FIGS. 6A and 6B, respectively.
Figure 9:
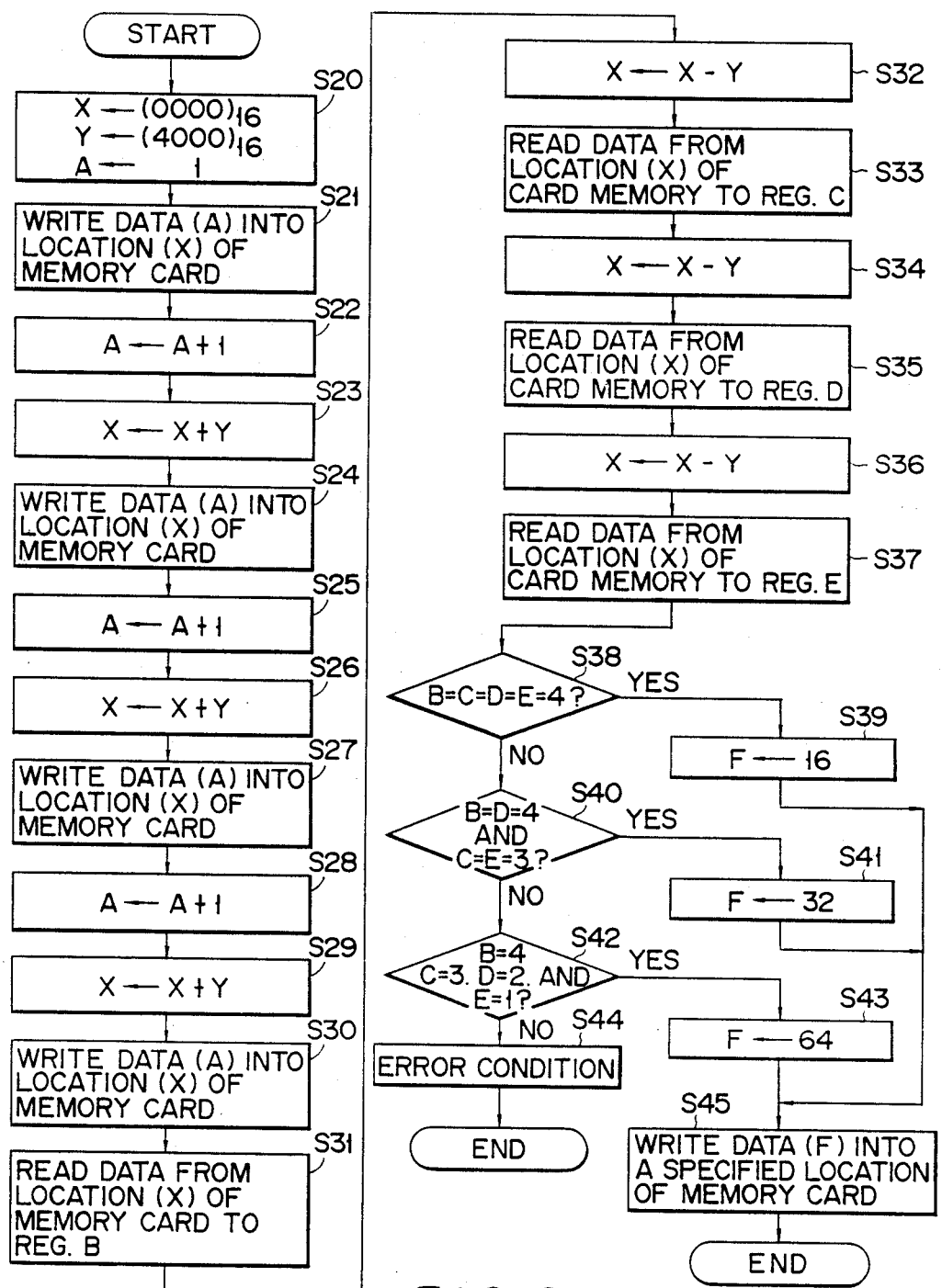
FIG. 9 is a flow chart explaining the operation of initializing the memory card which can have between one to four memory chips.

The electronic type writer is constructed to receive two types of memory cards shown in FIGS. 6A and 6B, for example. FIGS. 6A and 6B are circuit diagrams respectively showing memory cards of 32 K bytes and 64K bytes. Connector pins of each memory card are so arranged to be connected to lower 16 bit lines A0 to A15 of address bus AB, bit lines D0 to D7 of data bus DB, bit lines of control bus CB and enable lines EN. The memory card of FIG. 6A includes a 32 K-byte semiconductor memory chip 68A. The semiconductor memory chip 68A has an address input port connected to connector pins corresponding to lower 15 bit lines A0 to A14 of address bus AB, a chip selecting terminal connected to a connector pin corresponding to enable line EN, and input/output port and control port connected to connector pins corresponding to data bus DB and control bus CB, respectively. A connector pin corresponding to bit line A15 of address bus AB is kept in the nonconnection state. In contrast, the memory card of FIG. 6B includes two 32 K-byte semiconductor memory chips 68B and 68C and one-bit decoder 70. Each of semiconductor memory chips 68B and 68C has an address input port connected to connector pins corresponding to lower 15 bit lines A0–A14 of address bus AB and a chip selecting terminal connected to a corresponding one of output terminals of decoder 70. Further, each of semiconductor memory chips 68B and 68C has an input/output port and control port connected to connector pins corresponding to data bus DB and control bus CB in the same manner as described in the semiconductor memory chip 68A of FIG. 6A. The control gate of decoder 70 is connected to a connector pin corresponding to enable line EN. A connector pin corresponding to bit line A15 of address bus AB is internally connected to an address input terminal of decoder 70. FIGS. 7A and 7B show memory maps of the memory cards of FIGS. 6A and 6B, respectively. Word memory areas of semiconductor memory chip 68A of FIG. 7A can be accessed by bit address signals A0 to A14 irrespective of bit address signal A15. Word memory areas of semiconductor memory chips 68B and 68B of FIG. 7B can be accessed by bit address signals A0–A15.

The initializing operation will be described with reference to FIG. 8. CPU 58 is started when memory card 66 is inserted into inlet 50. First, CPU 58 performs the initialization process to set data "0000" (HEXADECIMAL), "8000" (HEXADECIMAL) and "1" into X- and Y-registers, and register A in step S1, respectively. Then, data in register A is written into a memory location of the semiconductor memory chip of memory card 66 designated by address X or "0000" in step S2, and the content of register A is incremented by one and set to "2" in step S3. In step S4, data Y required for accessing a memory chip different from that accessed by an address "0000", or data "8000" in this example is added to address X and the result is set into X-register. Then, data "2" in register A is written into a memory location of memory card 66 designated by address "8000" in step S5, and data is read out from the memory location of memory card 66 designated by address "8000" and set into register B in step S6.

Next, the contents in registers A and B are compared with each other in step S7, and if it is detected that they are different from each other, an error processing is effected in step S8. If it is detected that the contents in registers A and B are of the same value, then the content of register A is decremented by one and set to "1" and address X of X-register is reduced by "Y=8000" in step S9. Then, data is read out from a memory location of the memory chip of memory card 66 designated by address X and set into register B in step S10.

In steps 11, the contents in registers A and B are compared with each other, and if it is detected that they are of the same value, data "64" indicating 64K bytes is set into register C in step S12. However, if they are detected to be different from each other in step S11, the sum of the content of register A and one is compared with the content of register B in step S13. If it is detected that they are different from each other, an error processing is effected in step 14, and if they are detected to be of the same value, data "32" indicating 32 K bytes is set into register C in step S15. Thereafter, the content of register C is set into a specified memory location, for example the memory location of address "0001", of the semiconductor memory chip of memory card 66. If an error is detected in this routine, it is determined that a defective memory card is inserted or no memory card is inserted.

When memory card 66 of 32 K bytes shown in FIG. 6A is used, addresses 37 0000" to "7FFF" are allocated to memory chip 68A and another memory chip to which addresses "8000" to "FFFF" are allocated is not provided as shown in FIG. 7A. That is, the value of bit address signal A15 cannot be recognized in memory card 66. Addresses "8000" to "FFFF" are dealt with as being equivalent to addresses "0000" to "7FFF" and designate the same memory locations of memory chip 68A which are designated by addresses "0000" to "7FFF".

In order to initialize such a memory card, data A (="1") is first written into the memory location of memory chip 68A designated by address "0000" or the top address. Then, data A which is now set at "2" is tentatively written into the memory location of memory chip 68A designated by address "8000". However, a memory location directly corresponding to address "8000" does not actually exist, and the same memory location as designated by address "0000" is designated by address "8000". Therefore, data in the memory location at address "0000" is changed from "1" to "2". After this, address "8000" is used to read out data from the memory location at address "0000", so that data "2" can be read out. In this case, data A which has been written into the memory location is "2" and equal to data B which is read out from the same memory location. Therefore, "YES" is obtained in step S7. In this state, data A is decremented by one and set to "1", address X is changed from "8000" to "0000" by calculating the subtraction of "X-Y" in step S9. Then, it is checked whether or not B=A. In this case, since data "1" is erased by storing "2" in the memory location at address "0000", it is detected that A is different from B. Therefore, after data A is incremented by one, it is checked whether or not A=B. AT this time, since data A has been changed to "2", A=B is detected step S12. Then, it is determined that the memory capacity of memory card 66 is 32 K bytes, and data "32" is set into register C. The content "32" of register C is stored into the specified memory area of memory chip 68A.

When memory card 66 of 64 K bytes shown in FIG. 6B is used, addresses "0000" to "7FFF" are allocated to memory chip 68B of 32 K bytes and addresses "8000" to "FFFF" are allocated to memory chip 68C of 32K bytes as shown in FIG. 7B.

In order to initialize such a memory card, data A (="1") is first written into the memory location of memory chip 68B designated by address "0000" or the top address of memory chip 68B. Then, data A which is now set at "2" is written into the memory location of memory chip 68C designated by address "8000" or the top address of memory chip 68C. Then, address "8000" is specified to read out data from the memory location of memory chip 68C at address "8000", so that data "2" can be read out. In this case, data A which has been written into the memory location is "2" and equal to data B which is read out from the same memory location. Therefore, "YES" is obtained in step S7. In this state, data A is decremented by one and set to "1", and address X is changed from "8000" to "0000" by calculating the subtraction of "X-Y" in step S9. Then, it is checked whether or not B=A in step S11. In this case, since data "1" is stored in the memory location at address "0000", it is detected that A=B. Then, it is determined that the memory capacity of memory card 66 is 64K bytes, and data "64" is set into register C. Then content "64" of register C is stored into the specified memory area of memory chip 68B or 68C. In this embodiment, all the memory chips which can be provided in memory card 66 are sequentially specified and different items of preset data are written in predetermined memory locations of the specified memory chips, respectively. When at least one specified memory chip is not installed in memory card 66, part of data items stored in memory card 66 may be erased by overwriting. The number of data items remaining in memory card 66 is equivalent to that of memory chips which are actually provided in memory card 66. Thus, the number of the memory chips is detected by reading out the data from the predetermined memory location of each specified memory chip, comparing the readout data with the corresponding preset data, and determining the number of memory chips based on the comparison results. The memory capacity can be obtained from the number of memory chips. Accordingly, it is not necessary to form switches and signal lines in the memory card in order to detect the memory capacity of the !memory card, making the memory card simple in construction and attaining a highly reliable memory capacity detecting operation. Further, data indicating the detected memory capacity of memory card 66 is stored in the specified memory location of the memory chip of memory card 66. Therefore, it is possible to easily detect the memory capacity of memory card 66 by reading out data in the specified memory location when memory card 66 is used at the next time.

In the embodiment described above, memory card 66 is formed to have two memory chips at maximum. However, it is also possible to use the same initialization operation as described above for memory card 66 which has four or more memory chips. When a memory card having four memory chips of 16K bytes is used, for example, CPU 11 executes the initialization process according to the flow chart shown in FIG. 9. In this initializing process, first, head address "0000" and predetermined data "4000" are set into X- and Y-registers, respectively, and data "1" is set into register A in step S20. The data "4000" corresponds to the number of addresses allocated to each of the memory chips of the memory card. Then, data in register A is written into a memory location of the semiconductor memory chip of the memory card designated by address X or "0000" in step S21. Thereafter, the content of register A is incremented by one in step S22. Data "4000" is added to address X of the X-register and the result of addition is set into the X-register in step S23. Then, data is register A is written into a memory location of the semiconductor memory chip of the memory card designated by address X in step S24. The same operation is effected until data of register A is written into the fourth memory chip. Thus, after the write operation is effected four times through steps S25 to S30, data is first read out from the memory location of the fourth memory chip of the memory card designated by address X of the X-register and is set into register B in step S31. Then, address X is reduced by "4000" instep S32, and data is read out from the memory location of the third memory chip of the memory card designated by address X of the X-register and is set into register C in step S32. In the same manner, address X is reduced by "4000" in step S34, and, and data is read out from the memory location of the second memory chip of the memory card designated by address X of the X-register and is set into register D in step S35. Further, address X is reduced by "4000" instep S36, and data is read out from the memory location of the first memory chip of the memory card designated by address X of the X-register and is set into register E in step S37. After this, data in resisters B, C, D and E are compared with each other, and the memory capacity of the memory card is detected through steps S38 to 45. If it is detected that B=C=D=E=4, it is determined that the memory card has one memory chip and has a memory capacity of 16K bytes. If it is detected that B=D=4 and C=E=3, it is determined that the memory card has two memory chips and has a memory capacity of 32K bytes. Further, if it is detected that B=4, C=3, D=2 and E=1, it is determined that the memory card has four memory chips and has a memory capacity of 64K bytes.

Figure 10:
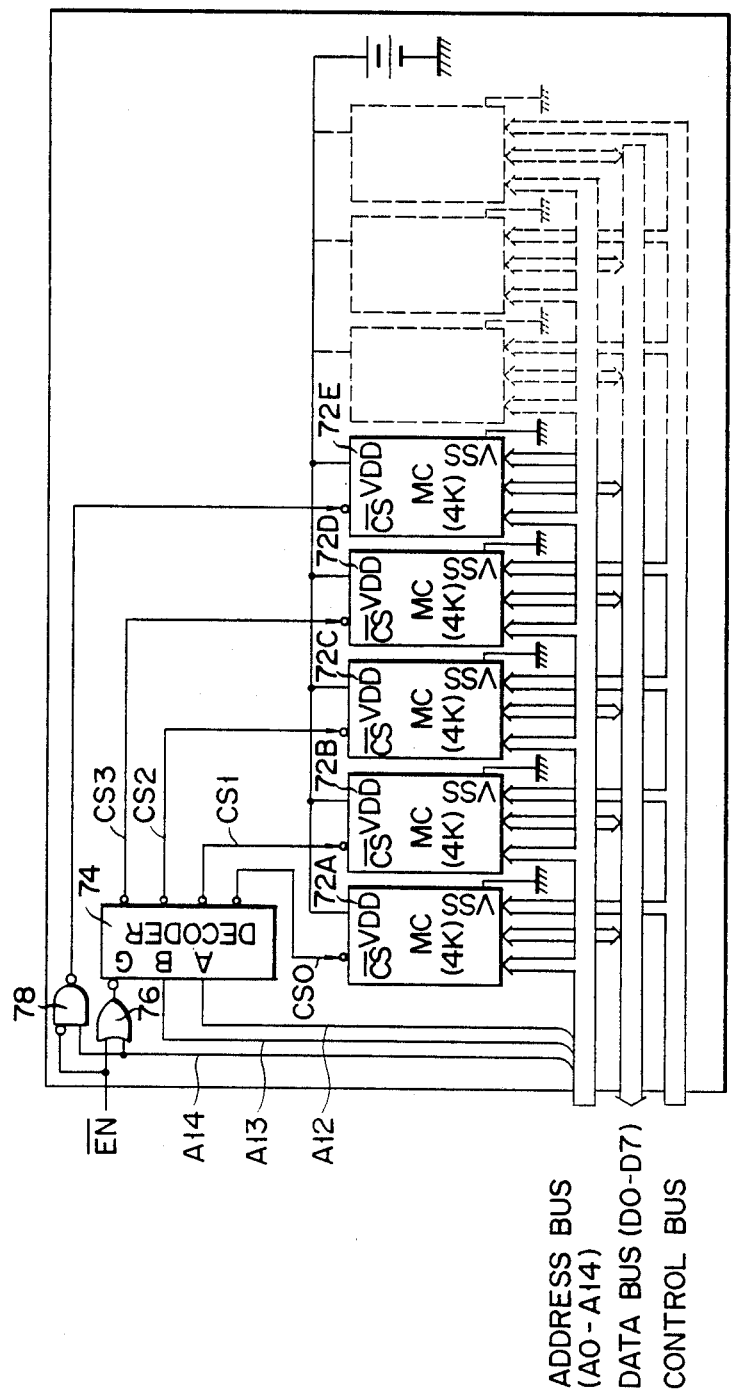
FIG. 10 is a circuit diagram of a modification of the memory card as is shown in FIGS. 6A and 6B.

FIG. 10 shows a circuit diagram of a modification of the memory card shown in FIGS. 6A and 6B. The memory card includes five 4K-byte memory chips 72A to 72E, and a decoding circuit formed of 2-bit decoder 74, OR gate 76, and NAND gate 78. The addresses of memory chips 72A to 72E are designated by address signals supplied via bit lines A0 to A11, and the chip selection for memory chips 72A to 72D is effected by output signals which are generated from decoder 74 in response to address signals supplied via bit lines A12 to A13 and an output signal of OR gate 76. The chip selection for memory chip 72E is effected by an output signal of NAND gate 78 address signal is supplied input terminals of OR gate 76 and NAND gate 78 via bit line A14, and chip enable signal is supplied to an input terminal of OR gate 76 and an inversion input terminal of NAND gate, via enable line EN.

With this construction, bit address signals A12–A14 are supplied to the decoding circuit to sequentially select eight memory chips starting from first memory chip 72A, and numeral data starting from "1" is written into a specified memory location of the selected memory chip each time bit address signals A12–A14 are changed. After data "8" has been written data is read out from the specified memory location and compared with the data which has been written into the specified memory location. When one of first to fourth memory chips 72A to 72D is selected, data which is read out from the specified memory location is the same as that which has been written into the specified memory location. However, when the number of the memory chip is "5", "6" or "7", data read out is "8" since numeral data of "5", "6", "7" and "8" are sequentially written into the specified memory location of the same memory chip (72E). That is, the readout data is different from data "5", "6" or "7" which has been tentatively written into the memory chip. In the case where the number of the memory chip is "8", readout data and written data are both "8" and are equal to each other. Therefore, it is determined that the memory card includes five memory chips and has a memory capacity of 20K bytes. Further, the decoding circuit used in this embodiment is not necessarily a full decoding circuit but can be formed as a simple decoding circuit which is only required to select five memory chips 72A to 72E.

What is claimed is:

1. A memory capacity detecting device for memory cards including at least one memory chip of a predetermined memory capacity, comprising:

address specifying means for generating an address signal which selectively specifies a predetermined number of memory chips;

data write-in means for writing different items of preset data into predetermined memory locations of the predetermined number of memory chips which each specifically correspond to one of the address signals generated by said address specifying means;

chip number detecting means for detecting the number of memory chips in said memory card by first reading out the data from the predetermined memory location of each specified memory chip after all the preset data items have been written, comparing the readout data with the corresponding preset data, and determining the number of memory chips based on the comparison results; and recording means for determining the memory capacity of said memory card based on the number of memory chips determined by said chip number detecting means, and recording information indicating said memory capacity into said memory card.

2. A memory capacity detecting device according to claim 1, wherein said recording means includes means for storing numeral data indicating said memory capacity in a specified memory location of said memory card.

3. A memory capacity detecting device according to claim 2, wherein said data write-in means includes means for generating said different items of the preset data by accumulatively adding data of a constant value to data of a predetermined value.

4. A memory capacity detecting device according to claim 3, wherein said memory card includes said predetermined number of memory chips, at most, and decoder means for decoding an address signal which is supplied via a minimum number of address lines required for selectively designating the memory chips included in said memory card.

5. A memory capacity detecting device according to claim 4, wherein said memory chip is a semiconductor memory chip serving as RAM.

6. A memory capacity detecting device according to claim 5, wherein each of said memory chips has a constant memory capacity.

7. A memory capacity detecting device according to claim 6, wherein said address specifying means, data write-in means, chip number detecting means are assembled as part of an electronic type writer.

* * * * *